June 18, 1963 R. W. PAGE 3,094,338
CHUCK
Filed Dec. 23, 1960

INVENTOR
RICHARD W. PAGE
BY
ATTORNEY.

United States Patent Office 3,094,338
Patented June 18, 1963

3,094,338
CHUCK
Richard W. Page, 307 Quaker Road, Chappaqua, N.Y.
Filed Dec. 23, 1960, Ser. No. 78,158
16 Claims. (Cl. 279—23)

This invention relates to chucks for drills and other tools.

More particularly, the invention is concerned with the provision of a resilient chuck operable by simple insertion in the shank of the drill or other tool and capable of being inserted and removed in a bore in the drive shaft or spindle without incorporating movable chucking or retaining elements therein.

Resilient chucks, such as shown, for example, in Page Patent No. 2,824,370, issued February 25, 1958 for Dental Drill, have previously been used in this class of service and have proven satisfactory. However, some difficulty has been found in the insertion of the chuck in the drive shaft and the chucks have had a comparatively short operating life due to the high rate of wear.

It is an object of the present invention to provide a resilient chucking element which permits very simple insertion in the drive shaft bore.

A further object of the invention is to provide a resilient chuck having improved wearing characteristics and longer life.

With these and other objects which will appear in the following description in mind, a chuck embodying the invention in a preferred form will now first be fully described with reference to the accompanying drawing, and the features forming the invention will then be pointed out in the appended claims.

The chucking system of the invention utilizes a tubular or hollow shaft 1, which is rotatably mounted in a dental contra-angle head casing by means of anti-friction bearings and carries a driving pulley, air turbine rotor or other shaft driving member, as more fully set forth in the above-mentioned patent.

The drive shaft 1 has an axial bore 2 which may be of uniform cylindrical form throughout substantially its entire length. Adjacent the open burr shank receiving end of the bore, a groove or enlargement 3 is formed to receive the chuck collar, as later described.

Figure 1:
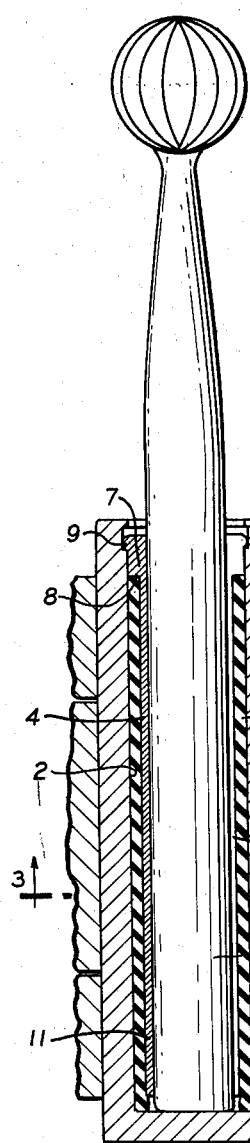
FIG. 1 is a somewhat schematic view showing the chuck of the invention in axial section on the line 1—1 of FIG. 3.
Figures 2, 2A:
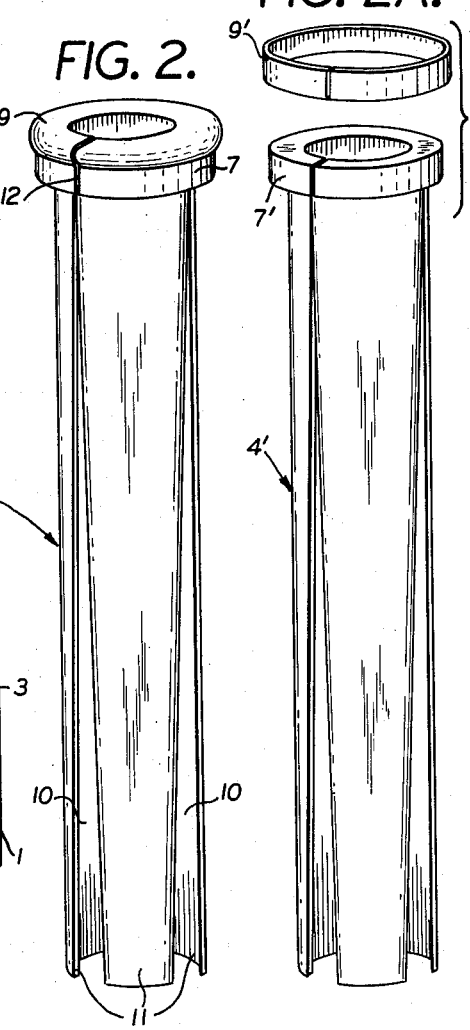
FIG. 2 is an enlarged isometric view showing a metallic sleeve element forming part of the chuck of FIG. 1.
FIG. 1a is a fragmentary view similar to FIG. 1 but showing a modification and FIG. 2a is a fragmentary view similar to FIG. 2 further illustrating the same modification.
Figure 1A:
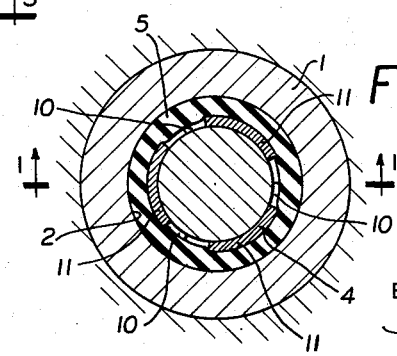
Figure 3:
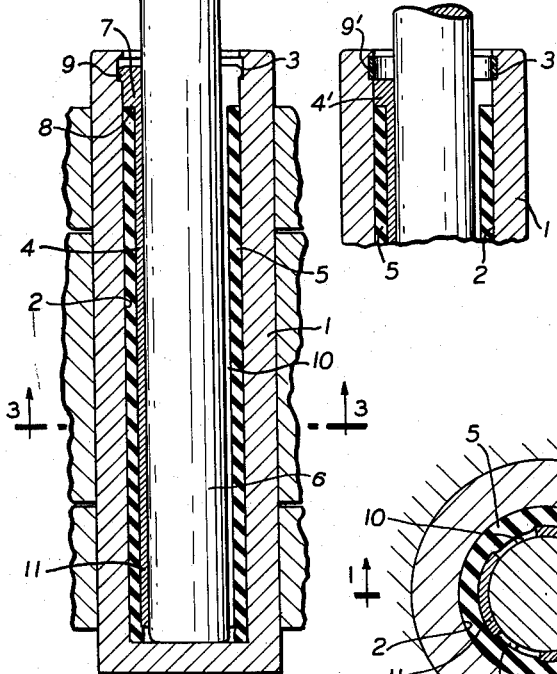
FIG. 3 is a section on the line 3—3 of FIG. 1.

The chuck proper comprises a generally tubular metal supporting member 4, as shown in FIG. 2, and rubber or other resilient sleeve 5 which fits on the member 4, as shown in FIGS. 1 and 3.

For clarity of understanding of the invention, the construction will be described with reference to the specific dimensions of an actual practical instrument, so that the relations between parts will be clear. At the same time, as is apparent, the dimensions given are not controlling and are subject to variation providing suitable proportion between the parts is maintained.

The drawing is to a scale of about ten-to-one, the shank of the burr being about one-sixteenth inch in diameter, as is presently standard in high speed dental drilling instruments and the bore 2 having a general diameter about 50% greater and a total depth or axial dimension of somewhat less than a half inch. The wall thickness of the resilient sleeve 5 may be about one hundredth of an inch and the wall thickness of the metal element 4, generally, about half that amount.

The outer, or burr shank receiving end of the member 4, is enlarged as indicated at 7 to form a shoulder 8 against which the resilient sleeve 5 abuts in approximately flush relation to the surface of the enlargement 7. A further enlargement 9 is provided and is received in the groove 3, previously mentioned, to retain the chuck in position axially of the shaft 1. Below the enlargement 7, the chuck element 4 is split, three generally triangular and symmetrically spaced slits 10 being suitable. As is clear from FIG. 3, each slit 10 may occupy about 60° of arc at the inner end of the member 4, the slits dividing the member 4 into three tongues or prongs 11, the tip of each such tongue 11 also occupying about 60° of arc at the inner end of the member 4. Each slit 10 is substantially triangular and terminates at or just below the shoulder 8, so that each tongue 11 tapers from a width of about .08" (one-third the circumference of member) at its base to about half that amount at its tip. A radial cut 12, passing through the enlarged end 7, 9 of element 4 and connecting with one of the slits 10 combines with that slit to split the tube as a whole, permitting the insertion action as described below. Cut 12 may remove about .01" of material, thus permitting a slight compression of the enlarged end 7, 9 of the member 4.

In using the chuck of the invention, the resilient tube 5 is first inserted in the bore 2. This is accomplished without difficulty, as the outside diameter of the tube 5 is substantially equal to the inside diameter of the bore 2 and the tube is free to compress radially, as needed. This operation does not differ substantially from present practice in the insertion of resilient chucking sleeve elements.

Next, the metal supporting member 4 is inserted, this operation being accomplished readily, and without tendency to collapse the resilient tube 5 into the bore by reason of the elasticity of the tongues 11. The outer end of the member 4, or enlargement or collar 9, may protrude radially beyond the cylindrical portion 7 of this member by a few thousandths of an inch, the compression permitted by slit 12 allowing projecting collar 9 of the element 4 to pass into the bore 2 and snap into the groove or enlargement 3 previously referred to. The groove 3 preferably has a clearance around the collar 9 when the latter is in expanded position, so that the cylindrical section 7 seats against bore wall 2, as indicated in FIG. 1. As soon as the collar 9 is in the groove 3, the element 4 expands, slit 12 opening up to its original or approximately its original width. The slightly tapered or rounded end of the burr shank 6 may now be forced into the tube 4 expanding the tongues 11 against the rubber or other resilient tube 5 which is permitted to flow into the slits 10, thus substantially filling these slits (this action is not illustrated in FIG. 1 so as not to obscure the showing of the elements) and firmly gripping the burr shank.

Figure 4:
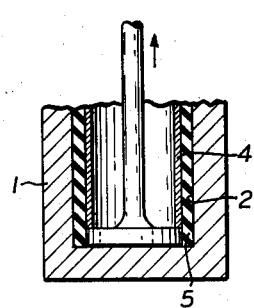
FIG. 4 is a detail fragmentary view of a portion of the chuck of FIG. 1 and illustrating the method of removing the chuck.

When a chucking device requires replacement (FIG. 4), the metal element resilient tube is readily extracted with a hooked implement and may then be replaced with new elements in the manner described above.

While the structure above described is preferred, particularly in instruments for dental drilling use and in the approximate size indicated, the invention at its broader aspect may also be embodied in a structure having a separate retainer member instead of the integral collar 9. Such a modification of the construction is shown in FIGS.

1a and 2a. As there shown, the metal insert 4' which may otherwise be identified with the insert 4 previously described, terminates in a cylindrical portion 7' at the lower edge of groove 3 and a split ring 9' is substituted for the integral rim 9. The ring 9' may be inserted after the resilient element 5 and metal insert 4 are in place and be removed prior to removing these elements, or it may be made with sufficient looseness to permit insertion and removal of the elements 4, 5 without removing the ring 9'.

As will be apparent to those skilled in the art, the dimensions and arrangements of parts, as, for example, the axial dimension of the groove 3 and enlargement 9, as well as the thickness of the snap ring 9' may be varied, to suit particular conditions, and the centering of the burr shank may be accomplished by the element seating against the peripheral wall of the groove 3 in addition to the wall of the bore generally or instead thereof.

What is claimed is:

1. A resilient chucking device comprising a drive shaft having a cylindrical axial bore open at one end for receiving a tool shank, a resilient sleeve insertable therein, an expansible split metal sleeve insertable, in turn, in the said resilient sleeve in position for receiving the shank of a rotary tool and being expanded thereby to compress the resilient sleeve against the bore wall.

2. A resilient chucking device comprising a drive shaft having a cylindrical axial bore and a peripheral groove in the bore wall, a resilient sleeve insertable in the bore, an expansible split metal sleeve insertable, in turn, in the said resilient sleeve in position for receiving the shank of a rotary tool and being expanded thereby to compress the resilient sleeve against the bore wall, the said expansible metal sleeve having a collar snap-fitting in the said groove.

3. A resilient chucking device comprising a drive shaft having a cylindrical axial bore open at one end for receiving a tool shank, a resilient sleeve insertable therein, an expansible metal sleeve insertable, in turn, in the said resilient sleeve in position for receiving the shank of a rotary tool and being expanded thereby to compress the resilient sleeve against the bore wall, the said metal sleeve having a plurality of longitudinal slits extending the major part of its length and dividing it into a plurality of tongues, and a single slit extending its full length.

4. A resilient chucking device comprising a drive shaft having a cylindrical axial bore and a peripheral groove in the bore wall, a resilient sleeve insertable in the bore inwardly of the groove, an expansible split metal sleeve insertable, in turn, in the said resilient sleeve in position for receiving the shank of a rotary tool and being expanded thereby to compress the resilient sleeve against the bore wall, the said expansible metal sleeve having a collar snap-fitting in the said groove, and a section adjacent the collar fitting the said bore and terminating in a shoulder in alignment with the said resilient sleeve.

5. A resilient chucking device comprising a drive shaft having a cylindrical axial bore and a peripheral groove in the bore wall, a resilient sleeve insertable in the bore, an expansible split metal sleeve insertable, in turn, in the said resilient sleeve in position for receiving the shank of a rotary tool and being expanded thereby to compress the resilient sleeve against the bore wall, the said expansible metal sleeve having a collar snap-fitting in the said groove, a section adjacent the collar fitting the said bore and terminating in a shoulder in alignment with the said resilient sleeve, and a plurality of longitudinal slits extending substantially from the said shoulder to an end of the sleeve and dividing it into a plurality of tongues.

6. A resilient chucking device according to claim 5, in which the said slits are substantially triangular in shape and divide the said expansible split metal sleeve into a plurality of tapering tongues.

7. A liner for a resilient tubular chuck sleeve comprising a split metal tube having an enlarged end terminating in a shoulder and slits extending substantially from the shoulder to its other end and dividing the element into a plurality of tongues.

8. A liner according to claim 7, comprising also a collar encircling and projecting radially outwardly from the said enlarged end for fitting in an instrument chucking bore groove.

9. A resilient chucking device comprising a drive shaft having a cylindrical axial bore, a resilient sleeve insertable in the bore, an expansible metal sleeve insertable, in turn, in the said resilient sleeve in position for receiving the shank of a rotary tool and being expanded thereby to compress the resilient sleeve against the bore wall, and a retainer member for holding the metal sleeve in the bore.

10. A resilient chucking device according to claim 9, in which the shaft has a peripheral groove in its bore wall and the retainer member comprises a snap ring fitting in the groove.

11. A resilient chucking device according to claim 9, comprising also a collar in axial alignment with said resilient sleeve and substantially fitting the bore and tool shank for centering the latter.

12. A resilient chucking device comprising a drive shaft having a cylindrical axial bore for receiving a tool shank, a resilient sleeve insertable therein, an expansible metal sleeve insertable, in turn, in the said resilient sleeve in position for receiving the shank of a rotary tool and being expanded thereby to compress the resilient sleeve against the bore wall, and a collar in axial alignment with the said resilient sleeve and substantially fitting the bore and tool shank for centering the latter.

13. A resilient chucking device comprising a drive shaft having a cylindrical axial bore, a resilient sleeve insertable in the bore, an expansible metal sleeve insertable, in turn, in the said resilient sleeve in position for receiving the shank of a rotary tool and being expanded thereby to compress the resilient sleeve against the bore wall, and means for holding the metal sleeve and resilient sleeve axially within the bore.

14. A resilient chucking device according to claim 13, in which the last said means comprises a member substantially fitting in the shaft and around the shank for centering the latter.

15. A resilient chucking device according to claim 2, in which the said collar substantially engages the shaft radially and fits the tool shank for centering the latter.

16. A resilient chucking device according to claim 12, in which the said collar also comprises means for retaining the same axially within the bore.

References Cited in the file of this patent

UNITED STATES PATENTS

| | | |
|---|---|---|
| 1,433,881 | Johnson | Oct. 31, 1922 |
| 2,429,700 | Sheffer | Oct. 28, 1947 |
| 2,641,478 | Sigg | June 9, 1953 |
| 2,869,882 | Zimmerman | Jan. 20, 1959 |
| 2,917,829 | Page | Dec. 22, 1959 |